United States Patent [19]
Turney

[11] 3,835,299
[45] Sept. 10, 1974

[54] NAVIGATIONAL COMPUTERS

[76] Inventor: Peter Baldwin Turney, 1405 Forest Park Ave., Baltimore, Md. 21207

[22] Filed: Sept. 21, 1973

[21] Appl. No.: 399,432

[52] U.S. Cl................. 235/61 NV, 235/78, 235/88
[51] Int. Cl......................... G06c 27/00, G06g 1/08
[58] Field of Search......... 235/61 NV, 61 B, 78, 88

[56] References Cited
UNITED STATES PATENTS

| | | | |
|---|---|---|---|
| 2,239,959 | 4/1941 | Gray | 235/78 |
| 2,775,404 | 12/1956 | Lahr | 235/61 B |
| 3,131,858 | 5/1964 | Warner | 235/61 NV |
| 3,497,678 | 2/1970 | Warner | 235/61 NV |
| 3,609,299 | 9/1971 | Wright | 235/78 |

Primary Examiner—Stephen J. Tomsky

[57] ABSTRACT

A navigational computer for solving wind vector problems including a plurality of rotatable discs having cooperatively arranged wind grid, aircraft grid, and 360° compass rose, for setting and reading air speeds, wind speeds and ground speeds, and for calculating drift angles and the crab angles necessary to compensate for drift. A runway orienter is incorporated in the wind grid and cooperates with the compass rose to indicate the direction of the various legs in airport traffic patterns.

7 Claims, 6 Drawing Figures

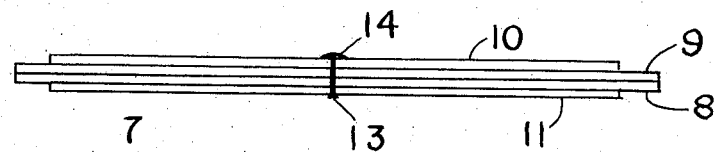
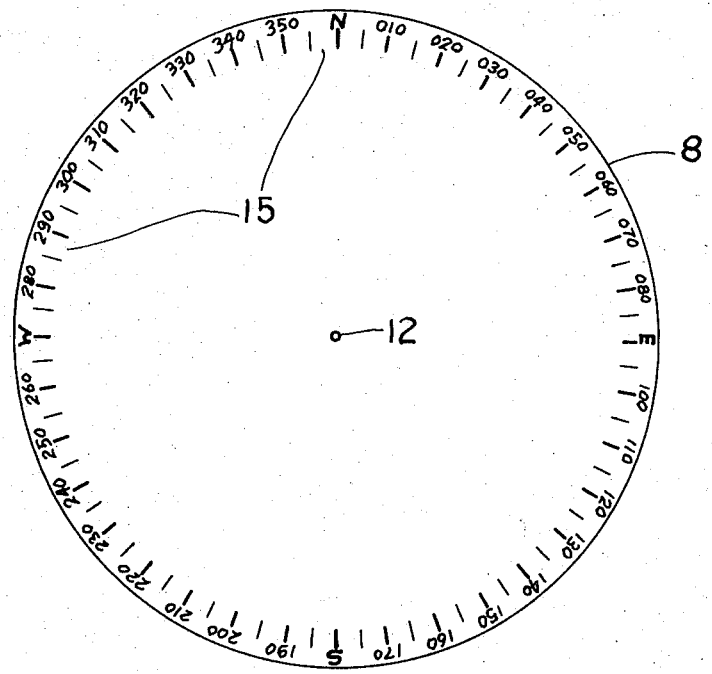
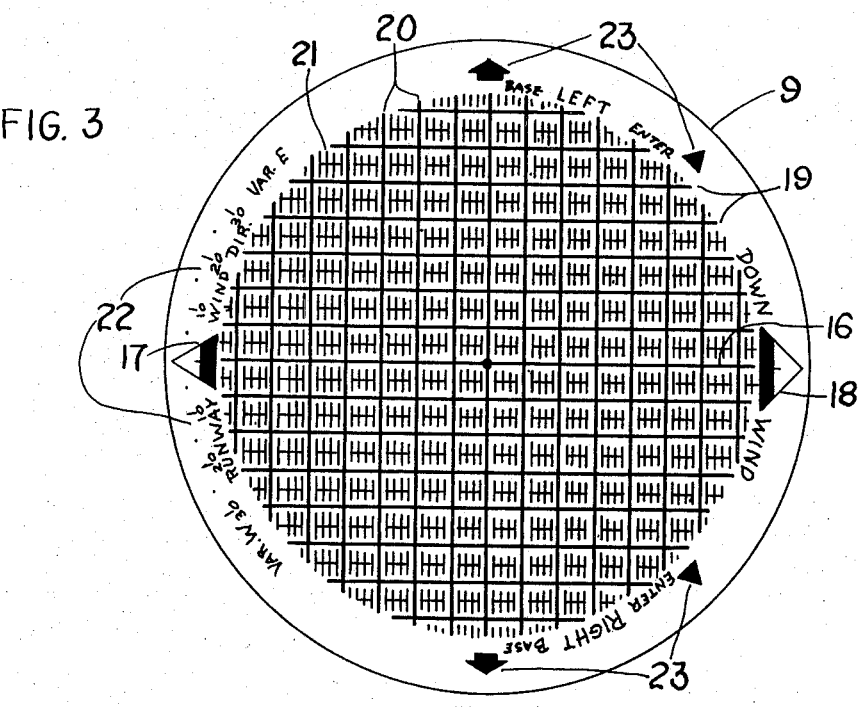

FIG. 6
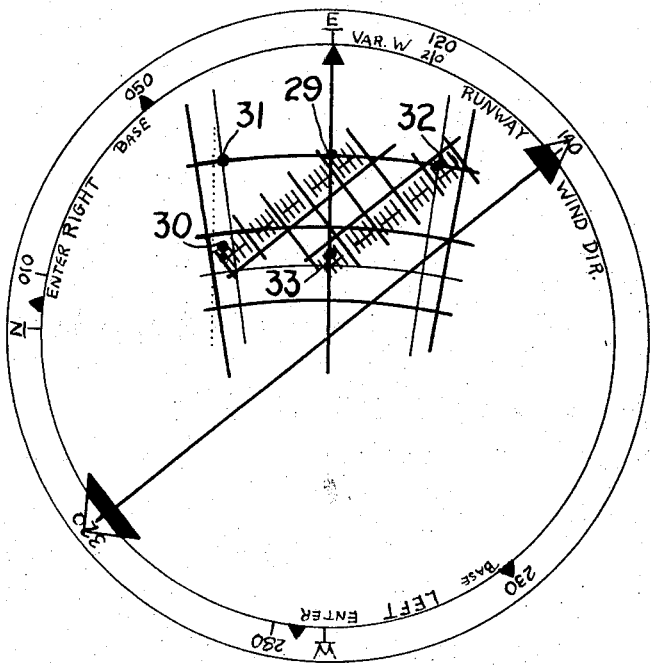
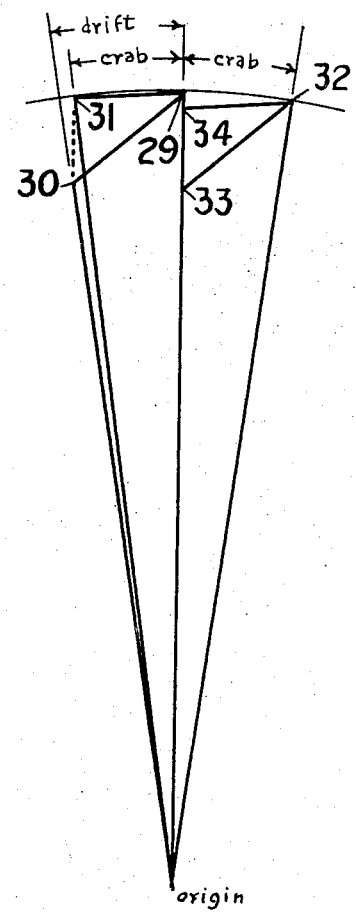
FIG. 5
FIG. 4

NAVIGATIONAL COMPUTERS

This invention relates to navigational computers or calculators of the circular-disc slide rule type, and more particularly to an improved computer especially adapted for solving certain aeronautical and navigational problems. Specifically, in one embodiment the calculator is designed for computing the velocity and direction of the wind while in flight, based on certain given navigational data, and for computing the heading and ground speed for planning the flight when the velocity and direction of the wind is forecast or known. The computer also may be used to solve other related problems.

It is well known that in air navigation a basic problem is the solution of a vector triangle of which one vector component is the wind, each side of the triangle representing a speed and a direction. Speed is usually measured in statute miles per hour or in knots. Direction is measured in degress clockwise from north. At times direction is measured from true North; but in aviation use it is usually measured from magnetic North, as more fully explained herein.

The three sides and six elements of the vector triangle are:

1. Aircraft Vector
   a. Heading — This is the direction in which the aircraft is pointed.
   If the air surrounding the aircraft is in motion (i.e., if there is a wind) the heading may differ substantially from the course.
   b. Air speed — This is the actual speed of the aircraft through the air. As the air surrounding an aircraft is generally in motion relative to the ground below, the air speed will differ from the ground speed in accordance with this relative motion.
2. Wind Vector
   a. Wind Direction — This is the direction from which the wind is blowing.
   b. Wind Speed — This is the speed or velocity of the wind at the particular altitude at which the aircraft is flying.
3. Resultant
   a. Course — This is the direction the aircraft actually moves across the earth. Course can be determined from a chart by measuring the angle clockwise from North to the direction of travel.
   b. Ground Speed — This is the effective speed of the aircraft relative to the ground.

Another factor which is used in computing navigational problems, is the crab angle. This is not an independent element but is computed from the true course and the true heading and actually is the difference between the direction of these two elements.

While it is readily apparent that the vector triangle may be solved formally by conventional trigonometry, it should be obvious that this form of solution is too slow and difficult to be practical under most flight conditions. Heretofore several types of graphic computers have been devised to speed up the solution to these navigational problems while maintaining reasonable accuracy.

As will be subsequently shown, the vector triangle, which is basic to air navigation problems, is unique in that the ground speed and air speed are generally of large magnitude compared to the wind velocity and consequently the sides of the triangle representing the ground speed and true air speed are normally considerably longer than the side representing the wind speed. This results in a long, narrow triangle with the apex at one end. Hence, in order to show the wind as a vector which is large enough to be readable with reasonable accuracy, computers heretofore have been inconveniently large and bulky.

It is therefore an important object of this invention to provide a compact pocket-size computer capable of solving air navigational problems of the type indicated hereinabove with reasonable accuracy. An object relating thereto is to provide a computer in which there is provided a graphic portion which shows only the wind vector on a sufficiently large scale for accurate computation.

Other computers, for example those described in U.S. Pat. Nos. 2,775,404 and 3,497,678, have eliminated the major portion of the vector triangle from graphic representation, retaining only the wind vector and its components whereby the same may be shown in sufficiently large scale for accurate computation. Although these computers accurately solve for the unknowns in the wind triangle, they do so by mathematically and trigonometrically resolving vectors into components, a means that many (probably most) pilots do not understand and cannot visualize, thereby increasing the chance of error and decreasing the pilot's perception of the effect of the wind upon his flight.

It is therefore an important object of this invention that, although a major portion of the wind triangle is eliminated from graphic representation on the computer, it being sufficient if the entire wind vector along appears, that, still, the solution is entirely graphic and the pilot, without resort to mathematics or trigonometry, can see on the face of the computer the effect the wind will have upon his direction of flight and speed over the ground.

One of the principal uses of air navigational computer is in flight planning, where the following are normally known to the pilot:

1. of the Aircraft Vector:
   a. the Air speed;
2. of the Wind Vector:
   a. the Wind Direction, and
   b. the Wind Speed;
3. of the Resultant:
   a. the Course, the desired direction of flight over the ground.

From this information the pilot is interested in determining the unknown elements:

1. of the Aircraft Vector:
   b. the Heading, to make good the desired Course over the ground; and
3. of the Resultant:
   b. the Ground Speed.

Heretofore it has been of the nature of computers graphically solving the wind triangle to proceed from the known to the unknown; to lay out the Aircraft Vector (but using the Course as Heading, since the latter is unknown) and the Wind Vector, from which the resultant course and ground speed can be determined. Unfortunately, since course is used as heading, the resultant shows, not the amount of crab required to produce a desired course over the ground, but the drift that results if a heading is maintained in the direction of the desired course. Where wind is small in relation to air speed, it may be assumed, without introducing large error, that crab is the same angle as drift, although in the opposite direction. However, where wind is large in relation to air speed, the angle of crab may differ substantially from the angle of drift it is to correct. Prior to this invention there has been no simple, satisfactory way to graphically determine crab angle.

It is therefore another important object of this invention to provide a computer which, when set to register the aircraft and wind vectors as set forth in the preceding paragraph and fully explained herein, will indicate not only the angle of drift, but will also, without further adjustment or movement of its member, indicate the crab angle necessary to exactly compensate for drift and produce a course in the desired direction, as well as the ground speed to be achieved.

It is customary for aircraft approaching to a landing at an airport to fly a rectangular traffic pattern, making all turns within the pattern in the same direction as prescribed for each particular airport. The legs of the pattern, in reverse order are: the "final," in line with the runway, from which the landing is made; the "base;" the "downwind," parallel to the "final" but in the opposite direction; and the "crosswind," sometimes used. In a right-hand pattern, all turns are made in a clockwise direction; in a left-hand pattern, in a counterclockwise direction. Traffic patterns, however, are entered by a 45° turn into the "downwind" leg: to the left when entering a right-hand pattern, and to the right when entering a left-hand pattern. It is important for pilots to known what courses they should follow within the pattern, but under the pressure of their other duties it is frequently difficult to quickly do the mental arithmetic necessary to determine these courses, particularly of the entry.

It is therefore another important feature of this invention to provide a computer which, when set to the direction of the active runway, will automatically indicate to the pilot the directions of the legs of the traffic pattern, both right and left-handed.

Pilots almost invariably fly "magnetic" courses, i.e., courses uncorrected for the earth's magnetic variation; and courses on the federal airways, as well as the orientation of airport runways, are given in terms of magnetic direction. However, with local exceptions not relevant here, forecast wind directions frequently apply to an area in which variation is not constant, making it difficult or misleading to forecast winds in other than a true direction. To reach a correct solution to the wind triangle, however, it must be worked wholly in turns of true directions or, preferably for the pilot, wholly in terms of magnetic direction.

It is therefore another inportant feature of this invention to provide a computer which, when set to solve the wind triangle as hereinafter set forth, will easily and automatically convert a "true" wind direction into a "magnetic" direction, thereby solving the wind triangle in a consistent form and providing the pilot with the magnetic solution he desires.

It is well known in air navigation that computations for speed, distance, and time must also often be made. Although it is true that many of these factors are measured by instruments, nevertheless corrections and computations must be made for various factors which might affect the readings of the instruments. For example, such factors as air density, weight, wind, and angle of bank affect the measurement of air speeds, altitude, take-off run, rate of climb, stall speed, etc.

Various computations have been made and tabulated which adequately serve the function of determining these factors. However, such tabulations, if in independent form, are not readily adapted for use in a rapidly moving aircraft in conjunction with a computer of the type which is contemplated by this invention.

It is therefore another important object of the invention to provide a computer, on one side of which may be provided correlated scales used in computing and solving such problems as time-speed-distance, fuel consumption, take-off run, rate of climb, stall speed, air speed corrections, and altitude corrections, and on the other side of which may be provided the various unique markings and arrangement of markings for solving the wind problems described herein, said two sides functioning to solve all of the problems normally confronting an air navigator.

An object relating thereto is to construct the computer that transparent windows and members are provided through which may be read scales imprinted on the back of other members of the computer. In this manner, one member may serve to compactly accommodate thereon a plurality of scales and function in many capacities.

Thus, the wind side of the computer comprises a pair of relatively movable members and a stationary member, all circular in form and mounted concentrically on a stud or grommet. The stationary member is provided with a compass rose about its circumference, by means of which the movable members may be properly oriented as to North, and as to each other.

The first movable member is transparent, of the same diameter as the stationary member, and mounted above it so the said compass rose is visible through the periphery. On this member, the "wind grid," is printed an arrow so the grid may be oriented to wind direction, and a series of designs so it is possible to construct a wind vector of any specified length from any point on the member. Around the circumference of this member are a series of additional arrows indicating the direction of the legs to be flown in the airport traffic pattern, and a scale to convert true wind direction into magnetic wind direction.

The second movable member is of a smaller diameter than the wind grid, mounted above it, and transparent so that the designs printed on the wind grid may still be seen. On this member, the "aircraft grid," is printed, to the same scale as the designs of the wind grid, a series of arcs indicating aircraft speeds and a series of radials indicating angular displacement from a centerline passing through the center of this grid. An index arrow at the end of this centerline permits the grid to be oriented to aircraft heading. It is thus readily apparent that the wind problems of air navigation may be accurately and readily solved on a simple pocket-sized slide-rule type computer with a high degree of accuracy.

Yet a further object is to provide a computer of the type indicated hereinabove which has means for maintaining the various members in accurate relationship one to the other without materially affecting the ready manipulation of the movable members.

Still another object is to afford a computer of the character described which is of simple, inexpensive construction, yet sturdy, accurate and compact.

The foregoing objects and other objects which will appear as the description proceeds are accomplished by this invention which consists of certain novel features of construction, arrangement and a combination of parts hereinafter fully described, illustrated in the accompanying drawings, and particularly pointed out in the appended claims; it being understood that various changes in the form, proportion, size and minor details of the structure may be made without departing from the spirit or sacrificing any of the advantages of the invention.

For the purpose of facilitating an understanding of the invention, the accompanying drawings illustrate a preferred embodiment thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a cross-sectional view of the computer;

FIG. 2 is a plan view of the base or body disc or the computer of FIG. 1 showing the wind problem side thereof;

FIG. 3 is a plan view of the wind grid;

FIG. 4 is a plan view of the aircraft grid;

FIG. 5 is a graphic representation of a typical air navigation vector triangle;

FIG. 6 is a representation of the vector triangle of FIG. 5 illustrating its relationship to the computer, and the manner in which it would be solved by the computer, illustrating only so much of the computer and its parts as is necessary to an understanding of the solution.

Referring now to the drawings, and more particularly to FIGS. 1 and 6, the computer indicated generally by reference number 7 comprises a plurality of circular discs including an opaque base or body disc member 8. Positioned on one side of member 8 is a rotatable transparent member 9, and another smaller rotatable transparent member 10, all on the wind side of the computer. A fourth rotatable member 11 of smaller diameter than member 8 is used in conjunction with the reverse side of disc 8 for the solution of other problems as herein set forth.

Each of these discs is in turn provided with a central annular aperture such as aperture 12 which enables then to be aligned and mounted on a grommet or stud 13 having a spring washer mounted thereon.

Thus it will be perceived that the grommet 13 and spring member 14 cooperate to force the discs together so that the proper frictional relationship is mantained between the discs. This is accomplished without, however, interfering with the rotatability of the computer members during operation. It should be apparent that the computer can function satisfactorily with or without small spacer disc separating members 11, 8, 9, and 10, each from its adjacent members, or with other types of fasteners, such as a bolt and nut assembly, an eyelet, or a rivet.

The back of disc 8 will not be described in detail in this application. Suffice it to say that it is provided with the necessary log scales and indicia which enable its use for solving the problems and making the corrections of speed-time-distance computations and various other corrections as indicated herein.

Referring to FIG. 2 of the drawings, the central basic disc 8 has imprinted along its periphery a compass rose 15, by means of which the wind grid 9 and the aircraft grid 10 may be oriented as to North and as to each other.

Referring to FIG. 3 of the drawings, the wind grid 9 is constructed of transparent material so the compass rose 15 of the basic disc 8 may be seen through it, and is of the same diameter as the central basic disc 8 so that, by pressing the fingers of each hand against the edge of one or the other of them, they may be rotated relative to each other. The wind grid 9 is imprinted with a baseline 16 running through the center of the disc with arrowheads on each end labeled "Runway--Wind Dir." 17, and "Down Wind" 18. Most of the area of the wind grid is covered by a series of designs constructed to a scale convenient to the speed of aircraft for which the computer is to be used, and designed to enable the pilot to construct a wind vector parallel to the baseline 16 of any desired length from any point on the grid. In the preferred embodiment are printed bold lines 19 parallel to the baseline 16, and bold lines 20 perpendicular to the baseline of a convenient scale as aforesaid. Within the square or rectangle formed by the bold lines 19 and 20 is imprinted a design 21 with another light line parallel to the baseline 16 and with several light lines perpendicular to the baseline 16 to enable the pilot to divide the distance between the bold perpendicular lines 20 into smaller portions, in the preferred embodiment, fifths.

Still referring to FIG. 3 of the drawings, a magnetic variation scale 22 to "uncorrect" true wind directions to magnetic wind directions has been centered on the "Wind Dir." index 17 so the entire wind solution may be made in terms of magnetic directions.

Still referring to FIG. 3 of the drawings, indices 23 have been imprinted around the periphery of the wind grid 9 showing the direction of the entry and base legs in both right and left-hand patterns when the runway index 17 is aligned to the heading of the applicable runway, the direction of the downwind leg being indicated in all cases by the Down Wind index 18.

Referring to FIG. 4 of the drawings, the aircraft grid 10 is constructed of transparent material to the designs of the wind grid 9 may be seen through it. In the preferred embodiment, the surface of the aircraft grid 10 is of a matte finish so it may be marked by pencil or pen, and smaller in diameter than the basic disc 8 and wind grid 9. Through its center is drawn the aircraft centerline 24 with an index arrow 25 at its end by which it may be set against the compass rose of the base disc 8. The origin of this centerline, zero velocity, may be off the disc, but aircraft speed arcs 26 drawn to the same scale as the wind velocity designs of the wind grid 9 and centered on the origin are drawn across the grid and the speeds marked where these arcs 26 intersect the centerline 24. Segments of radials 27 drawn from the origin appear on this grid representing angular distances away from the centerline 24, both to the right and left. To facilitate the solving of the crab angle as hereinafter explained, dotted lines 28 parallel to the centerline 24 appear on this grid, although a different type of line or figure would serve the same purpose. By giving the pilot the choice of two scales, one double the other, the upper range of one overlapping comfortably the lower range of the other, the invention permits the inclusion of a wider range of aircraft and wind velocities on a computer of reasonable size than would otherwise be possible. The preferred embodiment illustrated in the drawings is suitable for almost any aircraft with cruising speeds up to about 200 knots or MPH, but by constructing the device to a different scale, faster aircraft could be accommodated.

In the preferred embodiment different colors are employed to assist in differentiating between the markings on the aircraft grid and those on the wind grid.

To better understand the operation of the computer, the actual solution of an air navigational problem will now be described in detail. For this purpose attention is invited to FIGS. 5 and 6 of the drawings in which the solution of such a problem is graphically portrayed. Let us assume that it is desired to find the heading to produce a desired course over the ground and the ground speed, assuming the following elements:

| | |
|---|---|
| Course desired | 090° magnetic |
| Air speed | 110 knots |
| Wind direction | 120° true |
| Wind speed | 20 knots |
| Local magnetic variation | 20° West | it is assumed, as in the normal practice, that the entire problem is to be solved in terms of magnetic direction, except that the predicted wind direction is given relative to true North (also the normal practice).

To convert the true wind direction to a magnetic direction, the wind grid 9 is set to 120° on the compass rose according to the 20° W. variation mark, rather than by the Wind Direction arrow, which now indicates the magnetic direction of the wind. The aircraft grid is set to the desired course over the ground by setting its indexopposite index opposite 090° (E) on the compass rose. The computer is now "set" and the relative position of its members will not be changed.

On the centerline of the aricraft grid a mark 29 is made at 110 to end the aircraft vector; the markings to the left of the baseline are used for two reasons: first, they are on a better scale than those to the right and will produce a larger and more accurate solution on the computer; and second, it is apparent that if those to the right were used, the wind vector would probably go off the computer.

From the point 29 indicating the end of the aircraft vector, and employing the lines and figures on the wind grid, the wind vector is laid off in Down Wind direction parallel to the baseline. The scale must be the same as that used to lay off the aircraft vector; five knots for each large division and one for each small. A mark 30 is made on the aircraft grid at the end of this vector. The drift resulting if the desired course of 090° were the heading flown is measured at 9° by the radials on the aircraft grid; the ground speed of 98 knots is measured by the arcs on the aircraft grid.

To determine the crab angle to compensate for the 9° left drift, a point 31 is marked on the 110 knot speed arc to be at the same distance from the aircraft centerline as the point 30; the light dotted lines on the aircraft grid paralleling the centerline may be used to facilitate this. The angular distance of point 31 away from the aircraft centerline, as measured by the radials, in this case 8° indicates the crab angle necessary to compensate for drift. Obviously, crab must be to the right, in a direction opposite to drift.

To verify this solution, and to compute the ground speed to be made good at this crab angle, a mark 32 is made at the end of the aircraft vector, this time constructed 8° to the right of the centerline. The wind vector is constructed as hereinbefore explained from this point, and the end 33 of such wind vector, falling on the centerline of the aircraft grid, proves that a right crab angle of 8° results in a course over the ground of 090°. The speed arcs show that such a crab will produce a ground speed of 97 knots.

Referring to FIG. 5 of the drawings, a geometric representation of the foregoing problem and solution, a side of the triangle 32–33–34 is drawn from point 32 to point 34 on the centerline, parallel to side 29–31 of the triangle 29–30–31. It is given that side 30–31 is parallel to side 33–34, a segment of the centerline. Side 29–30 is parallel to side 32–33 since they both represent the direction of the wind. All sides being parallel, triangles 29–30–31 and 32–33–34 are equiangular. Moreover, since points 31 and 32 are equidistant from the centerline, it is easily proven that the parallel sides 29–31 and 32–34 are of the same length. It follows that the triangles are congruent, and that a wind vector drawn from point 32 will end at point 33 on the centerline.

Conversely, when it is desired to determine the direction and velocity of the wind, while in flight, the operation of the computer is as follows, assuming these elements:

| | |
|---|---|
| Course over the ground | 090° magnetic |
| True air speed | 110 knots |
| Ground speed | 97 knots |
| Crab angle | 8° right |

Referring to FIG. 6 of the drawings, the aircraft grid would be set to the course of 090° and a mark 33 made on the centerline to indicate a speed over the ground of 97 knots. Another mark 32 is made on the aircraft grid where the radial 8° to the right of the centerline meets the speed arc of 110 knots, indicating the end of the aircraft vector. The wind grid is then rotated under the aircraft grid until an imaginary line from point 32 to point 33 is parallel to the baseline of the wind grid, the "Wind Direction" arrow then pointing in the direction from which the wind is coming; the parallel lines and the figures on the wind grid previously described may be used to determine when the centerline is parallel. The wind direction of 140° magnetic is then read from the compass rose opposite the "Wind Direction" arrow, and its velocity of 20 knots determined by the markings on the wind grid according to the same scale by which aircraft velocities were set on the aircraft grid. If a true wind direction is desired, it may be found opposite the point on the variation scale indicating local magnetic variation.

The purpose of the runway orienter has previously been explained. An illustration of its use may be seen in FIG. 6 of the drawings. If, for instance, a pilot where making an approach to runway 14, that is, the runway most nearly aligned with magnetic direction 140°, the "Runway-Wind Direction" arrow of the wind grid would be set at 140° of the compass rose. The entry and base legs of the airport traffic pattern would be read opposite the appropriate arrows: 275° and 230°, respectively, if a left-hand pattern were prescribed for the airport; and 005° and 050°, respectively, if a right-hand pattern were prescribed. In both cases the downwind leg is indicated by the "Down Wind" arrow.

It is believed that this invention, the mode of construction and assembly of the described embodiment, and many of its advantages should be readily understood from the foregoing without further description, and it should also be manifest that while a preferred embodiment of the invention has been shown and described for illustrative purposes, the structural etails details nevertheless capable of wide variation within the purview of my invention as defined in the appended claims.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

What I claim and desire to secure my Letters Patent of the United states is:

1. A computer for the solution of navigational problems of an aircraft traveling in a moving body of air, comprising a plurality of cooperating discs mounted on a common central axis and rotatable with respect to each other; one of said discs having a compass rose circumferentially formed on it; another of said discs, the wind grid, having a wind direction index thereon and a series of designs of a given scale by reference to which a wind vector may be constructed from any point thereon of any desired velocity; and the third of said discs, the aircraft grid, being constructed to the same scale as said wind grid and bearing an aircraft direction index at the end of a diametrical centerline, and arcs and radials centered on the origin indicating, respectively, aircraft velocities and angular distances from said centerline; said origin being on or off said disc; said wind direction index and aircraft direction index being positioned to cooperate with said compass rose and properly orient said wind and aircraft grids as to North and as to each other.

2. The computer of claim 1, upon the aircraft grid of which is inscribed a series of lines parallel to said centerline, by reference to which the downwind end of the wind vector may be projected any distance in either direction parallel to said centerline.

3. The computer of claim 1, upon the circumference of the wind grid of which are inscribed indices indicating the various directions to be flown in airport traffic patterns when said wind direction index has been aligned to the runway direction.

4. The computer of claim 1, upon the wind grid of which has been inscribed a magnetic variation scale centered on said wind direction index, by reference to which true wind directions can be set upon the computer as magnetic directions.

5. The computer of claim 1, the markings upon the wind and aircraft grids of which are of contrasting colors.

6. The computer of claim 1, the velocities on the aircraft grid whereof may be set or determined according to either of two separate scales, one double the other and the lower end of the higher scale comfortably overlapping the higher end of the lower scale.

7. The computer of claim 1, constructed to a scale to solve the navigational problems of any vehicle traveling in a moving medium, as, for example, a ship in a current, the wind and aircraft grids thereof being referred to, respectively, as the current grid and the vehicle grid.

* * * * *